US012397623B2

(12) United States Patent
Zhu

(10) Patent No.: US 12,397,623 B2
(45) Date of Patent: Aug. 26, 2025

(54) METHOD FOR ENHANCING INTERIOR DISPLAY READABILITY IN MOTORIZED OBJECTS AND SYSTEM THEREFOR

(71) Applicant: Xinyu Zhu, San Jose, CA (US)

(72) Inventor: Xinyu Zhu, San Jose, CA (US)

( * ) Notice: Subject to any disclaimer, the term of this patent is extended or adjusted under 35 U.S.C. 154(b) by 846 days.

(21) Appl. No.: 17/687,258

(22) Filed: Mar. 4, 2022

(65) Prior Publication Data

US 2023/0278403 A1 Sep. 7, 2023

(51) Int. Cl.
| | |
|---|---|
| *B60J 3/06* | (2006.01) |
| *B60J 3/04* | (2006.01) |
| *B60K 35/00* | (2024.01) |
| *B60K 35/22* | (2024.01) |
| *B60K 35/40* | (2024.01) |

(52) U.S. Cl.
CPC . *B60J 3/06* (2013.01); *B60J 3/04* (2013.01); *B60K 35/00* (2013.01); *B60K 35/22* (2024.01); *B60K 35/415* (2024.01); *B60Y 2200/11* (2013.01)

(58) Field of Classification Search
CPC ..... B60K 35/00–90; B60K 2360/00–96; B60J 3/00–06; B60Y 2200/00–92; G02B 27/00–648; G02B 2027/0105–0198
See application file for complete search history.

(56) References Cited

U.S. PATENT DOCUMENTS

| | | | |
|---|---|---|---|
| 7,110,177 B2 | 9/2006 | Sugino et al. | |
| 8,467,129 B2 | 6/2013 | Munro | |
| 9,837,707 B2 | 12/2017 | Villarroel et al. | |
| 10,437,056 B2 | 10/2019 | Nambara et al. | |
| 10,457,202 B2 | 10/2019 | Tanaka et al. | |
| 10,532,637 B2 | 1/2020 | Shi et al. | |
| 10,921,587 B2 | 2/2021 | Hayashi et al. | |
| 2003/0001988 A1 | 1/2003 | Maeda et al. | |
| 2006/0007550 A1* | 1/2006 | Tonar | B60R 1/088 359/604 |

(Continued)

FOREIGN PATENT DOCUMENTS

EP 1186941 A1 3/2002

*Primary Examiner* — Christopher A Lamb, II

(74) *Attorney, Agent, or Firm* — Mei & Mark LLP; Manni Li

(57) ABSTRACT

A method for improving readability of a display inside a motorized object comprises applying a polarization means on a side window of a motorized object, wherein an ambient incident light ray comes through the side window and is reflected by a surface of a display inside the motorized object to form a reflected light ray, and substantially filtering out display incident light S-polarization and allowing display incident light P-polarization to pass through. The polarization means has a linear polarization reflecting or absorbing direction that is substantially parallel to the plane of the surface of the display. A display readability enhancing system comprises the polarization means. When ambient light passes through the window and shines onto the interior display, the dominant light polarization is p-polarization for the interior display with minimum surface reflectivity upon reflecting from the interior display, resulting in good display visibility under strong ambient light conditions.

18 Claims, 12 Drawing Sheets

(56) References Cited

U.S. PATENT DOCUMENTS

| | | | |
|---|---|---|---|
| 2006/0274218 A1* | 12/2006 | Xue | G02F 1/133536 |
| | | | 349/16 |
| 2010/0177383 A1* | 7/2010 | Kamada | C03C 17/42 |
| | | | 977/773 |
| 2011/0182081 A1 | 7/2011 | Oeuvrard et al. | |
| 2013/0279016 A1 | 10/2013 | Finger | |
| 2019/0317325 A1* | 10/2019 | Malinovskaya | G02B 5/3033 |
| 2020/0164725 A1* | 5/2020 | Lee | G02F 1/133536 |
| 2020/0201037 A1* | 6/2020 | Yamamoto | B60K 35/00 |
| 2021/0191139 A1* | 6/2021 | Robinson | B60K 35/00 |
| 2021/0349346 A1 | 11/2021 | Smith et al. | |

* cited by examiner

METHOD FOR ENHANCING INTERIOR DISPLAY READABILITY IN MOTORIZED OBJECTS AND SYSTEM THEREFOR

TECHNICAL FIELD

The present invention relates to method and system to enhance the readability of the interior display in a motorized object by applying on the side window with light polarization means.

BACKGROUND OF INVENTION

Interior displays are critical components for many motorized objects, such as vehicles, boats, planes, etc. In some cases, there are more than one display in the motorized object. For example, there are usually two displays in a vehicle: one is in the dashboard in front of the driver, showing the driving condition information; the other is located in the front and between the driver and passenger, functioning as the vehicle infotainment display. A major issue with the interior display is that the readability of the display can be easily impacted by the ambient light conditions.

For vehicle drivers and passengers, the display readability at different ambient conditions is important as they need to read information from the display or interact with the display. A strong sunlight reflection from the display could easily wash out the display image so that the driver and passenger could not see the display information clearly. Such bad display readability under ambient light conditions may cause severe driving safety issues. As the interior display becomes more important, and sometimes the key feature, in the operation of the motorized objects, the interior display readability issue needs to be directly addressed, however, it has been largely ignored by the industry.

SUMMARY OF INVENTION

The present invention solves the interior display readability issue in the motorized object under different ambient light conditions and provides a method for enhancing the interior display readability in a motorized object.

The present invention provides a method for improving the readability of a display inside a motorized object, comprising applying a polarization means on a side window of a motorized object, wherein an ambient light propagates through the side window to become a display incident light, the display incident light is reflected by a surface of a display inside the motorized object to form a reflected light, and the display incident light and the reflected light form a display incident plane, and substantially filtering out S-polarization relative to the display incident plane from the ambient light and allowing P-polarization relative to the display incident plane from the ambient light to pass through the side window by the polarization means, wherein the polarization means has a linear polarization reflecting or absorbing direction that is substantially parallel to a plane of the surface of the display; the polarization means is on the side window that is on a passenger side, a driver side, or both the passenger and driver sides of the motorized object; and the side window is a front side window, a rear side window, or both front and rear side windows.

In the present invention, the polarization means may be passively applied on the side window or switchable on the side window.

In the present invention, the side window may be of a round, oval, trapezoid, rectangle, square, triangle, or irregular shape.

In the present invention, the linear polarization reflecting or absorbing direction of the polarization means may have no more than 30 degree deviation from being parallel to the plane of the surface of the display; preferably, no more than 20 degree deviation from being parallel to the plane of the surface of the display; more preferably, no more than 10 degree deviation from being parallel to the plane of the surface of the display; and most preferably, no more than 5 degree deviation from being parallel to the plane of the surface of the display.

In the present invention, the polarization means may filter out at least 75% of the S-polarization from the ambient light; preferably, at least 88% of the S-polarization from the ambient light; more preferably, at least 97% of the S-polarization from the ambient light; and most preferably, at least 99% of the S-polarization from the ambient light.

The present invention further provides a display readability enhancing system for use in the method of the present invention which comprises the polarization means. The polarization means in the present invention has the linear polarization reflecting or absorbing direction that is substantially parallel to the plane of the surface of the display; and the polarization means is on the side window that is on the passenger side, the driver side, or both the passenger and driver sides of the motorized object.

In the display readability enhancing system of the present invention, the polarization means may be located on an interior side of the side window or on an exterior side of the side window, or sandwiched between two layers of the side window.

In the display readability enhancing system of the present invention, the polarization means of the display readability enhancing system may be a passive means or switchable.

In the display readability enhancing system of the present invention, the polarization means may filter out at least 75% of the S-polarization from the ambient light.

The present invention improves the vehicle's display readability by implementing a polarization means on the vehicle's side windows so that the side windows filter out the ambient incident light's S-polarization, while only allowing P-polarization to pass through.

BRIEF DESCRIPTION OF THE DRAWINGS

FIGS. 3A and 3B show the method and system for improving display readability of the present invention, wherein FIG. 3A shows the light propagation and polarization change effect of the present invention implemented in one side window of a vehicle, and FIG. 3B shows the light propagation and polarization change effect of the present invention implemented in a further side window of a vehicle.

FIG. 4A shows the preferred polarization reflecting or absorbing direction parallel to the display surface plane; FIG. 4B shows the direction with a deviation of 30° from the preferred direction; FIG. 4C shows the direction with a deviation of 20° from the preferred direction; FIG. 4D shows the direction with a deviation of 10° from the preferred direction; FIG. 4E shows the direction with a deviation of 5° from the preferred direction.

FIGS. 5A to 5H show side views of the side windows in different shapes where the method and system for improving display readability of the present invention apply, wherein FIG. 5A shows an irregular-shaped window with straight horizontal and vertical sides, FIG. 5B shows an irregular-shaped window with round edges, FIG. 5C shows a circular window, FIG. 5D shows an oval window, FIG. 5E shows a trapezoidal window, FIG. 5F shows a rectangular window, FIG. 5G shows a triangular window, and FIG. 5H shows a square-shaped window.

FIG. 9A shows the dependency of the display ACR on the light incident angle in the case of the ambient illuminance 2000 lux in Example 1; FIG. 9B shows the dependency of the display ACR on the light incident angle in the case of the ambient illuminance 20000 lux in Example 2; and FIG. 9C shows the dependency of the display ACR on the light incident angle in the case of the ambient illuminance 100000 lux in Example 3.

DETAILED DESCRIPTION OF INVENTION

The present invention is described in detail in connection with the drawings. Any one of ordinary skill in the art may modify or change the present invention as described below without departing from the scope of protection for the present invention.

The method and system for improving display readability of the present invention is useful in motorized objects, including but not limited to, passenger or unmanned vehicles, boats, aircraft, watercrafts, truck, train, etc., having side windows typically made of transparent glass or plastic and display panel in the interior.

Figure 1:
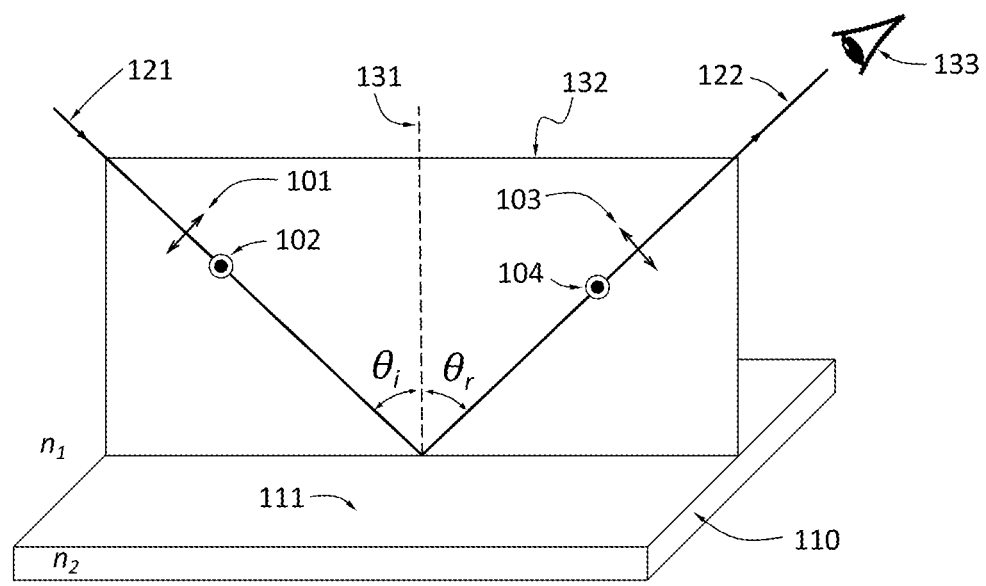
FIG. 1 shows the reflection of the ambient incident light by the surface of the display and propagates towards eye viewing direction as an issue to be addressed in the present invention.

As shown in FIG. 1, when an ambient light shines onto an object's surface, there is generally a light reflection from the object's surface. Such ambient light surface reflection can add noise to a display image quality and affect the display's readability. Ambient incident light 121 propagates from an ambient medium having refractive index $n_1$ to display 110 having refractive index $n_2$. Ambient incident light 121 is reflected by surface 111 of display 110 and propagates towards the viewer's eye 133. Incident light 121, a surface normal line 131 that is perpendicular to display surface 111, and reflected light 122 form light incident plane 132. Incident light 121 comprises both P-polarization 101 and S-polarization 102. P-polarization 101 is parallel to incident plane 132. S-polarization 102 is perpendicular to incident plane 132 and parallel to surface 111 of display 110. Reflected light 122 also comprises both P-polarization 103 and S-polarization 104. Angle $\theta_i$ is light incident angle, and angle $\theta_r$ is light reflecting angle.

In the present invention, unless otherwise noted, "P-polarization" is referring to the display incident light P-polarization that is parallel to the display incident plane, and "S-polarization" is referring to the display incident light S-polarization that is perpendicular to the display incident plane and parallel to the display surface.

The display may have a flat surface or a curved surface. A display center surface tangential plane may be defined as follows. For a curved display surface, the display center surface tangential plane is the plane tangential to the display curved surface center. For a display with a flat surface, the display center surface tangential plane is the same plane as the display surface. In the present invention, unless otherwise noted, "display surface" or "surface of display" is referring to the display center surface tangential plane.

The light reflection from the display surface may be quantified by the following Fresnel Equations:

$$R_P = \left| \frac{n_1 \sqrt{1 - \left(\frac{n_1}{n_2}\sin\theta_i\right)^2} - n_2\cos\theta_i}{n_1 \sqrt{1 - \left(\frac{n_1}{n_2}\sin\theta_i\right)^2} + n_2\cos\theta_i} \right|^2, \quad (1)$$

$$R_S = \left| \frac{n_1\cos\theta_i - n_2\sqrt{1 - \left(\frac{n_1}{n_2}\sin\theta_i\right)^2}}{n_1\cos\theta_i + n_2\sqrt{1 - \left(\frac{n_1}{n_2}\sin\theta_i\right)^2}} \right|^2, \text{ and} \quad (2)$$

$$R_{TOTAL} = \frac{R_P + R_S}{2}, \quad (3)$$

where $R_P$ is the light reflectance of P-polarization, $R_S$ is the light reflectance of S-polarization, and $R_{TOTAL}$ is the total light reflectance when the incident light has both P-polarization and S-polarization. If the incident light has only one polarization, such as P-polarization, then the total light reflectance $R_{TOTAL}$ equals to $R_P$. Further, $n_1$ is the light refractive index of the ambient medium, $n_2$ is the light refractive index of the substrate of the display 110 in FIG. 1, and $\theta_i$ is the light incident angle.

Figure 2:
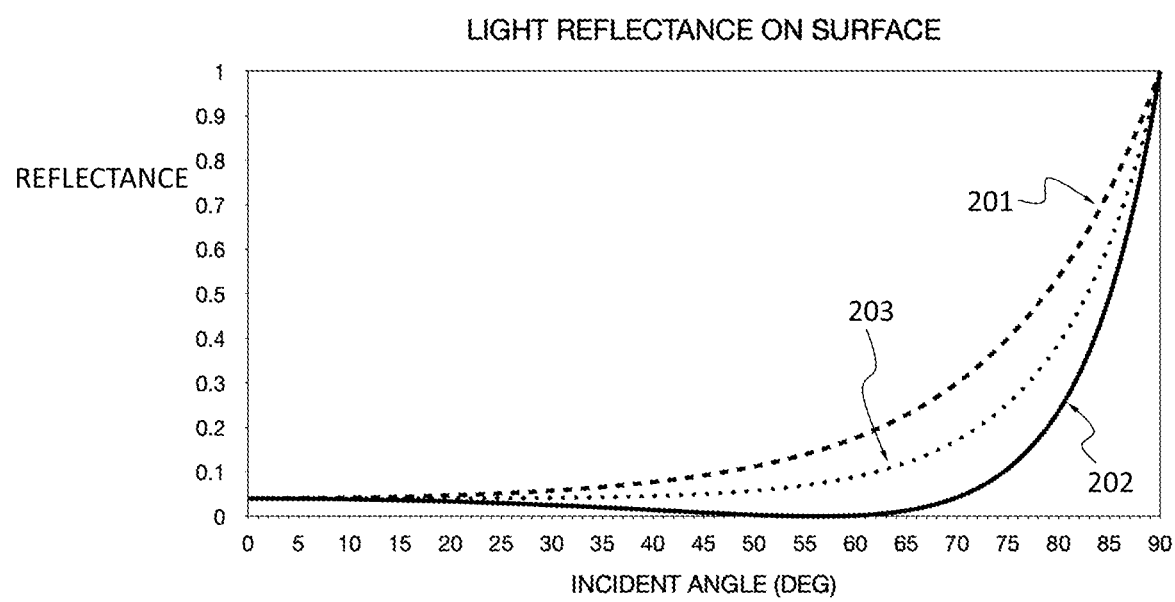
FIG. 2 shows the display surface light reflectance of incident light with P-polarization, S-polarization, or both, at different incident angles according to the Fresnel Equation in the present invention. Dashed curve 201 is the light reflectance of the S-polarization $R_S$. The solid curve 202 is the light reflectance of the P-polarization. The dotted curve 203 is the total light reflectance $R_{TOTAL}$.

As shown in FIG. 2, the display surface light reflectance at different incident angles changes according to the Fresnel Equation. S-polarization reflectance $R_S$ in dashed curve 201 keeps on increasing as the incident angle increases. On the other hand, P-polarization reflectance $R_P$ in solid curve 202 gradually decreases from 0° incident angle to around 56° incident angle. At around 56° incident angle, P-polarization reflectance $R_P$ reaches 0. The angle is called the Brewster Angle. When the incident angle increases further from the Brewster Angle, $R_P$ increases quickly. If the incident light comprises an equal intensity of both P-polarization and S-polarization, then the total reflectance $R_{TOTAL}$ in dotted curve 203 monotonously increases as the incident angle increases.

When a display is exposed in ambient light conditions, the display surface's light reflectance adds noise to the display image, which causes the display readability issue. As shown in FIG. 2, when the incident angle increases, total reflectance $R_{TOTAL}$ in dotted curve 203 increases more, resulting in even poorer display readability at large viewing angles. S-polarization's reflectance $R_S$ in dashed curve 201 is the major contributing factor causing total reflectance $R_{TOTAL}$ in dotted curve 203 increase when the incident angle increases. The present invention provides the method and system to filter out S-polarization from the ambient incident light while retaining the P-polarization, therefore, keeping total surface reflectance $R_{TOTAL}$ in the reflected light relatively low, which equals to $R_P$ (less than about 4%) from 0° to 70° incident angle as shown in solid curve 202 in FIG. 2. Such a low surface reflectance significantly reduces the ambient light noise added onto the display image when the viewer sees the display; therefore, the display readability can improve greatly.

The method for improving readability of a display inside a motorized object in the present invention applies a polarization means to substantially filter out S-polarization in the ambient incident light and allow P-polarization in the ambient incident light to pass through the side window by the polarization means. At least about 65% of the S-polarization is filtered out, for example, at least 70%, and preferably, at least 75% of the S-polarization is filtered out.

In the present invention, the display's native contrast ratio is defined by the equation below:

$$\text{DISPLAY NATIVE CONTRAST RATIO} = \frac{L_{BRIGHT}}{L_{DARK}}, \quad (4)$$

where $L_{BRIGHT}$ is the display luminance at the display bright state, while $L_{DARK}$ is the display luminance at display dark state. If the display is used in an ambient lighting condition, then the display's readability can be presented using the display ambient contrast ratio (ACR), as defined by the equation below:

$$\text{DISPLAY AMBIENT CONTRAST RATIO } (ACR) = \frac{L_{BRIGHT} + \frac{I_{AMBIENT}}{\pi} \cdot R_{SURFACE}}{L_{DARK} + \frac{I_{AMBIENT}}{\pi} \cdot R_{SURFACE}}, \quad (5)$$

where $L_{BRIGHT}$ is the display luminance at the display bright state, while $L_{DARK}$ is the display luminance at display dark state. $I_{AMBIENT}$ is the illuminance of the ambient lighting condition. A typical overcast day illuminance is in the range of 1000 to 4000 Lux. A typical full daylight illuminance is in the range of 8000 to 30000 Lux. A typical direct sunlight illuminance is in the range of 80000 to 200000 Lux. $R_{SURFACE}$ is the display surface reflectance, and $\pi$ is a constant ($\pi \approx 3.1415926$).

Figure 3A:
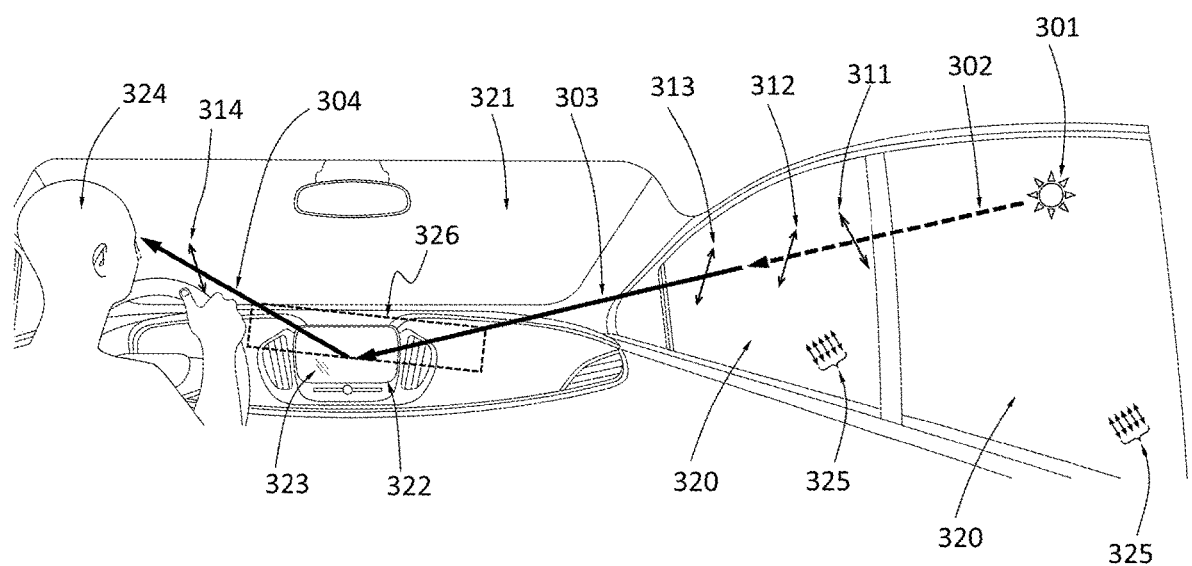

As shown in FIG. 3A, the light propagation and polarization change effect is shown as the method and system of the present invention are implemented in one side window of a vehicle. In the present invention, the side window may be any side windows at the driver side or the passenger side, at the front row or the rear rows. The vehicle comprises a side window 320, a front windshield window 321, and a main display 322 with a display surface 323. The ambient light 302 from the ambient light source 301 (such as sunlight) passes through the side window 320. After passing through the side window 320, the ambient light 302 becomes the incident light 303. Then the incident light 303 is reflected by the display surface 323. Upon reflection from the display surface 323, the reflected light 304 reaches the viewer 324. The incident light 303 and the reflected light 304 form an incident plane 326. The ambient light 302 is an unpolarized light, which has S-polarization 311 and P-polarization 312; the S-polarization 311 is parallel to the display surface 323, and the P-polarization 312 is parallel to the incident plane 326. The side window 320 has a polarization means 325 that absorbs or reflects the S-polarization 311 of the ambient light 302, but allows P-polarization 312 to pass through. As the result, the incident light 303 has P-polarization 313 only, which is parallel to the incident plane 326. Similarly, the reflected light 304 also only has the P-polarization 314, which is parallel to the incident plane 326.

Figure 3B:
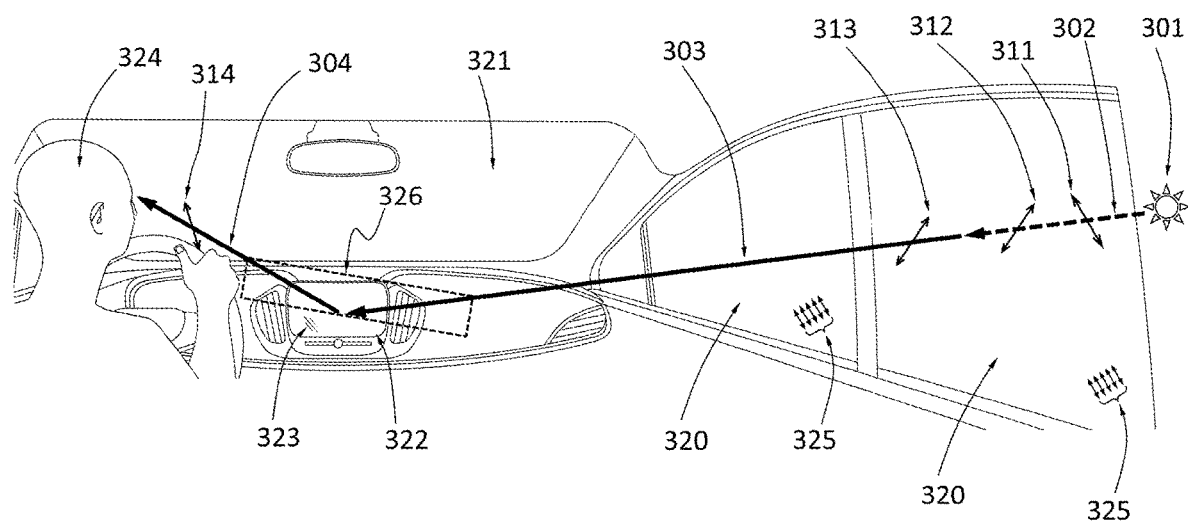

As shown in FIG. 3B, the ambient light may pass through other side windows, such as the rear row side windows. Similarly, to those shown in FIG. 3A, the ambient light 302 passes through the second-row passenger side window 320, then the incident light 303 is reflected by the display surface 323 of the display 322 and reaches the viewer 324.

In FIGS. 3A and 3B, the side window 320 has the polarization means 325 with filtering function that absorbs or reflects the S-polarization 311 of the ambient light 302 so that the incident light 303 has P-polarization only. Such a P-polarization-only incident light 303 has low display surface reflectance $R_P$ as shown in FIG. 2.

As shown in FIGS. 4A to 4E, the side window 320's linear polarization means have a linear polarization reflecting or absorbing direction, which is preferably parallel to the display surface plane. With such a preferred linear polarization reflecting or absorbing direction, the display's incident light only has P-polarization, no S-polarization. Therefore, the display reflectance is low, and the display readability is good at different ambient conditions.

The side windows' linear polarization reflecting or absorbing direction may deviate from the preferred direction. The side window's linear polarization reflecting or absorbing direction forms an angle with respect to the display surface plane: in the present invention, the angle is preferably no more than 30°, preferably no more than 20°, more preferably no more than 10°, and most preferably no more than 5°.

Figure 4A:
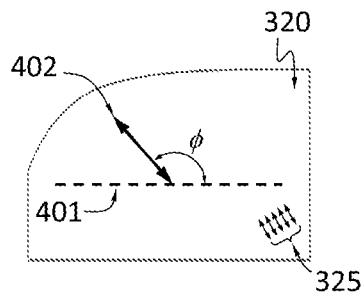
FIGS. 4A to 4E show side views of the angle of linear polarization reflecting or absorbing direction of the polarization means on the side window in the present invention, where

FIG. 4A is the side view of the side window 320 having a polarization means which has a preferred linear polarization reflecting or absorbing direction 402 that is parallel to the display surface plane. The side window 320 absorbs or filters out the linear polarization direction 402 of the incoming ambient light. The linear polarization direction 402 is parallel to the display surface plane and it forms an orientation angle $\phi$ with respect to the horizontal reference direction 401. Therefore, the linear polarization direction 402 is exactly the S-polarization for the incident light onto the display surface. As the linear polarization direction 402 is the reflecting or absorbing direction of the polarizer means of the side window 320, when the ambient light shines onto the side window, only P-polarization can pass through the side window. Such P-polarization only incident light onto display has low surface reflectance and provides good ambient light readability.

Figure 4B:
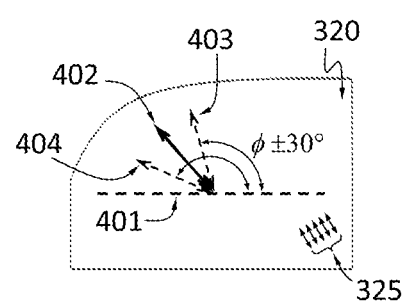

FIG. 4B shows the side view of the side window 320 having a polarization means which has a linear polarization reflecting or absorbing direction deviating from the preferred linear polarization reflecting or absorbing direction 402 by ±30°. The dashed arrow directions 403 and 404 show the deviation range boundary. The preferred linear polarization reflecting or absorbing direction 402 is parallel to the display surfacer plane.

Figure 4C:
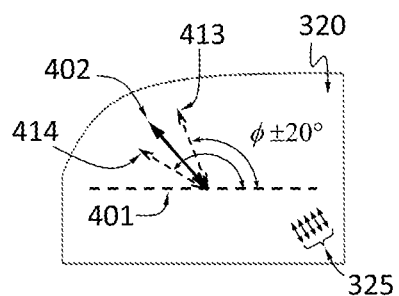

FIG. 4C shows the side view of the side window 320 having a polarization means which has a linear polarization reflecting or absorbing direction deviating from the preferred linear polarization reflecting or absorbing direction 402 by ±20°. The dashed arrow directions 413 and 414 show the deviation range boundary. The preferred linear polarization reflecting or absorbing direction 402 is parallel to the display surfacer plane.

Figure 4D:
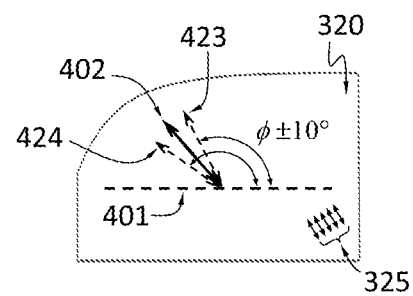

FIG. 4D shows the side view of the side window 320 having a polarization means which has a linear polarization reflecting or absorbing direction deviating from the preferred linear polarization reflecting or absorbing direction 402 by ±10°. The dashed arrow directions 423 and 424 show the deviation range boundary. The preferred linear polarization reflecting or absorbing direction 402 is parallel to the display surfacer plane.

Figure 4E:
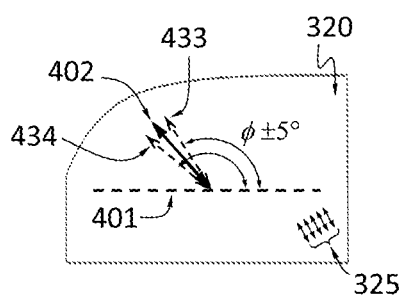
Figure 5A:
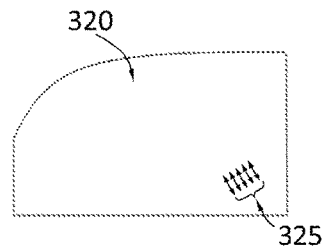
Figure 5B:
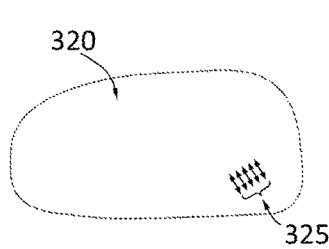
Figure 5C:
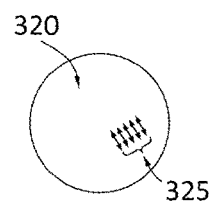
Figure 5D:
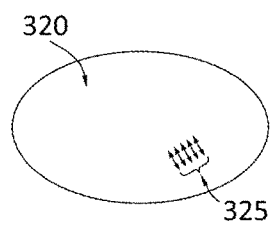
Figure 5E:
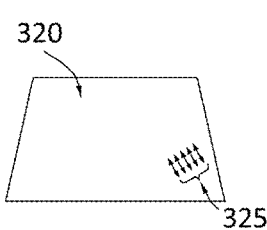
Figure 5F:
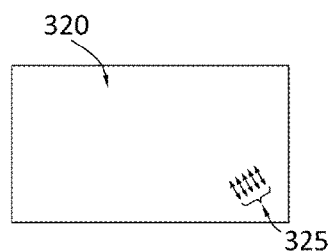
Figure 5G:
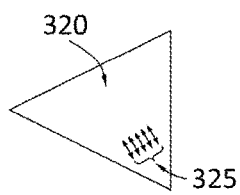
Figure 5H:
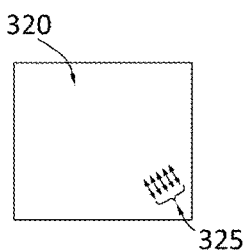

FIG. 4E shows the side view of the side window 320 having a polarization means which has a linear polarization reflecting or absorbing direction deviating from the preferred linear polarization reflecting or absorbing direction 402 by ±5°. The dashed arrow directions 433 and 434 show the deviation range boundary. The preferred linear polarization reflecting or absorbing direction 402 is parallel to the display surfacer plane.

In the present invention, the polarization means on the side windows may be applied in different shapes of side windows. For examples, FIGS. 5A to 5H show different shapes side windows including round, oval, trapezoid, rectangle, square, triangle, or irregular shapes.

In the present invention, to implement the side window polarization means with the filtering function, the linear polarization filtering means can be located at different interfaces of the side window stack.

Figure 6:
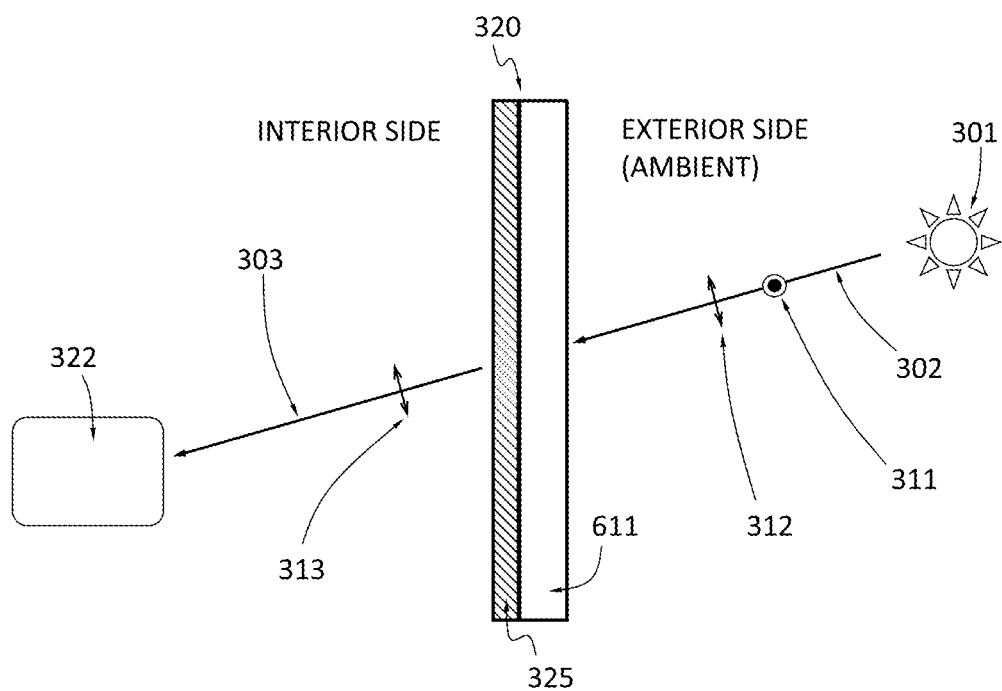
FIG. 6 is a cross-sectional view showing the first embodiment of the present invention where the polarization means is located at the interior side of the side window glass.

FIG. 6 shows the cross-sectional view of the first embodiment of the present invention where the linear polarization means is located at the interior side of the side window. The side window 320 comprises a transparent layer 611 and a linear polarization means 325. The linear polarization means 325 is located at the interior side, and the transparent layer 611 is located at the exterior side (ambient light source side). The ambient light 302 from the ambient light source 301 has both P-polarization 312 and S-polarization 311. When the ambient light 302 passes through the side window 320, the linear polarization means 325 filters out the S-polarization 311 while allowing the P-polarization 312 to pass through. As a result, the incident light 303 onto the display 322 has P-polarization 313 only.

Figure 7:
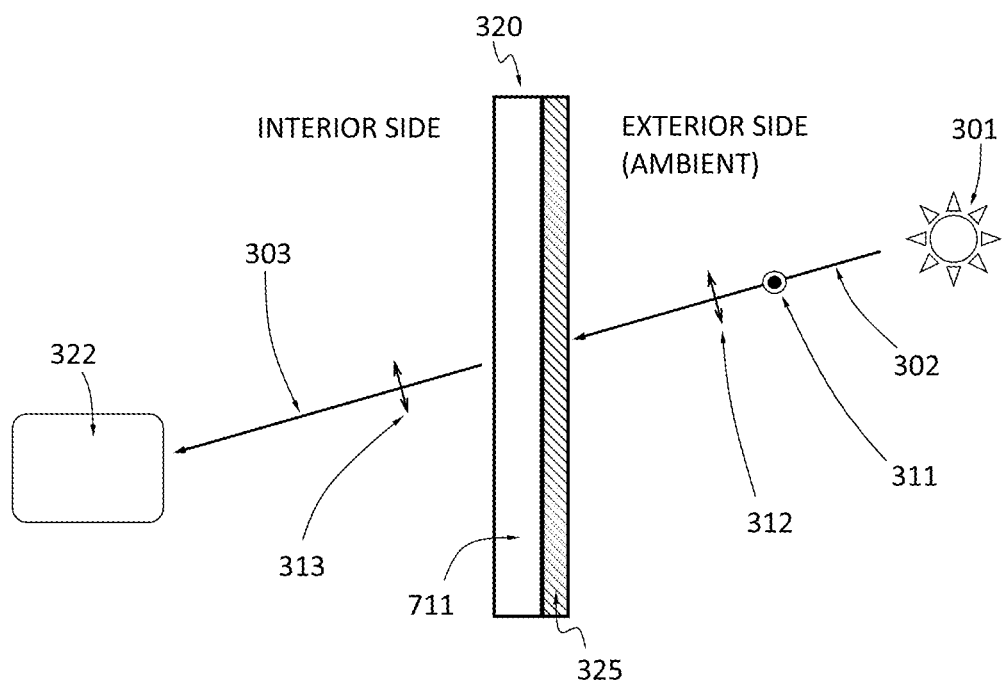
FIG. 7 is the cross-sectional view showing the second embodiment of the present invention where the polarization means is located at the exterior side (ambient lighting side) of the side window glass.

FIG. 7 shows the cross-sectional view of the second embodiment of the present invention where the linear polarization means is located at the exterior side (ambient lighting side) of the side window glass. The side window 320 comprises a transparent layer 711 and a linear polarization means 325. The linear polarization means 325 is located at the exterior side (ambient light source side), and the transparent layer 712 is located at the interior side. The ambient light 302 from the ambient light source 301 has both P-polarization 312 and S-polarization 311. When the ambient light 302 passes through the side window 320, the linear polarization means 325 filters out the S-polarization 311 while allowing the P-polarization 312 to pass through. As a result, the incident light 303 onto the display 322 has P-polarization 313 only.

Figure 8:
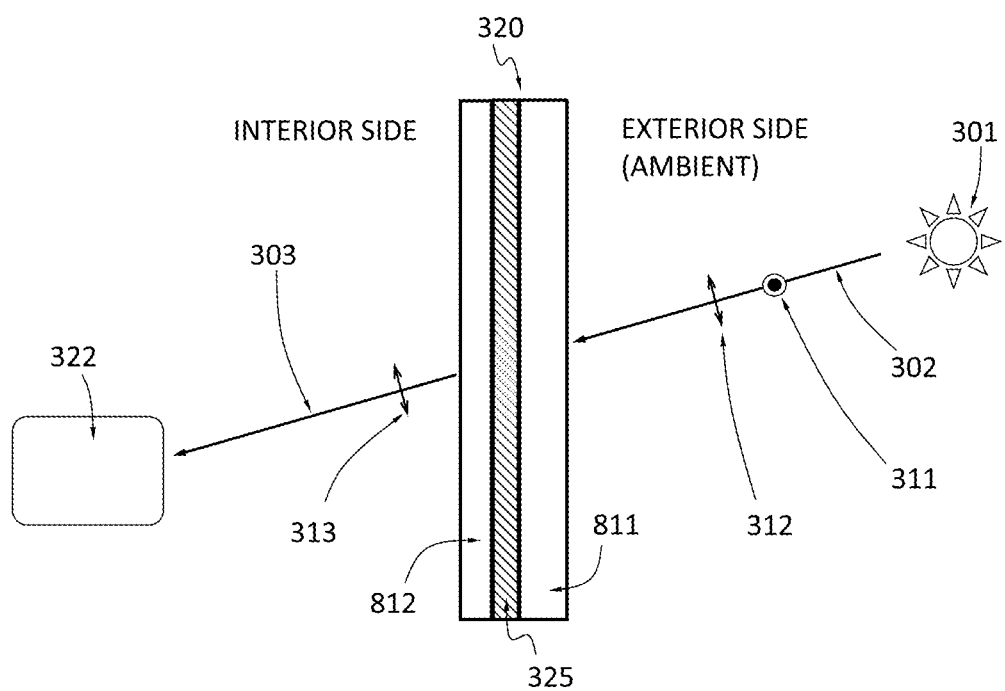
FIG. 8 is a cross-sectional view showing the third embodiment of the present invention where the polarization means is located between the interior glass and the exterior glass of the side window glass.

FIG. 8 shows the cross-sectional view of the third embodiment of the present invention where the linear polarization means is located in between the interior glass and the exterior glass of the side window glass. The side window 320 comprises a first transparent layer 811, a second transparent layer 812, and a linear polarization means 325. The linear polarization means 325 is sandwiched between the first transparent layer 811 and the second transparent glass layer 812. The ambient light 302 from the ambient light source 301 has both P-polarization 312 and S-polarization 311. When the ambient light 302 passes through the side window 320, the linear polarization means 325 filters out the S-polarization 311 while allowing the P-polarization 312 to pass through. As a result, the incident light 303 onto the display 322 has P-polarization 313 only.

In the present invention, the polarization means for reflecting or absorbing the S-polarization may be passively applied or switchable as to the polarization properties.

The first method is to have a linear polarizer layer applied onto the side window glass surface or sandwiched between the side window glasses. The linear polarizer layer may be produced by dyeing a polyvinyl alcohol (PVA) based film with a dichroic dye such as iodine and then stretching it in an aqueous boric acid solution. When the incident light passes through such a linear polarizer, one linear polarization is absorbed by the polarizer while the orthogonal linear polarization can pass through. The passing through linear polarization is determined by the polarizer PVA layer stretching direction. The manufacturing of linear polarization means is known in the art, such as a linear polarizer film layer, referring to U.S. Pat. No. 7,110,177B2 and U.S. Patent Application Publication No. 20030001988A1 for detailed manufacturing material and process to make the linear polarizer film, which are incorporated herein by reference.

A second method is to have a switchable polarizing means sandwiched between the side window glass. Such switchable polarizer means can be electrically controlled and change the passing-through linear polarization orientation. When the linear polarization means in the side window is an adaptive means, such as an electronically controlled guest-host liquid crystal device using dichromatic or dichroic dye material, it is known in the art how to manufacture and apply it. See European Patent Application No. EP1186941A1 and U.S. Patent Application No. 20210349346A1 for detailed manufacturing material and process to make electronically switchable liquid crystal polarizer devices, which are incorporated herein by reference.

The following examples of the present invention show that under three different ambient lighting conditions, the present invention provides improved display ambient contrast ratio (ACR). In the present invention, it is more preferable to have smaller deviation angle to maximize the display ACR performance gain. In these examples, the display is assumed to have a maximum luminance of 800 nits and a native contrast ratio of 1000:1.

Example 1. Overcast Day Ambient Condition

Figure 9A:
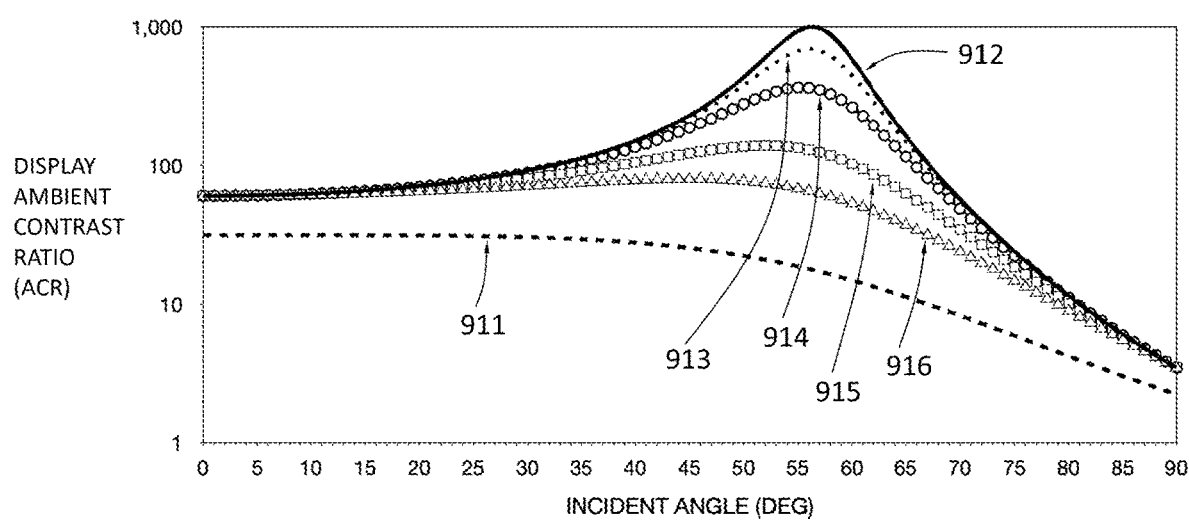
FIGS. 9A to 9C are graphs showing the change in display ambient contrast ratio (ACR) in relation to the incident angle (unit: DEG=degree, also depicted by the symbol ° in the present application) according to Examples 1-3 in the present invention, where

FIG. 9A shows the display ACR dependency on the light incident angle in the case of the ambient illuminance 2000 lux (roughly a typical overcast day ambient condition). The dashed curve 911 is the condition that the incident light onto the display surface is an unpolarized light that has both P-polarization and S-polarization and no polarization filtering control.

The solid curve 912 shows the condition that the incident light onto the display surface is a linearly polarized light, whose polarization direction is parallel to P-polarization so that it has 100% P-polarization and 0% S-polarization. The condition is achieved by filtering the ambient light with a linear polarizer layer that has the linear polarization reflecting or absorbing direction parallel to the display surface plane so that the ambient light S-polarization is filtered out but only P-polarization passes through.

The dotted curve 913 shows the condition that the incident light onto the display surface is a linearly polarized light, whose polarization direction deviates from P-polarization by 5° so that it has 99% P-polarization and 1% S-polarization. The condition is achieved by filtering the ambient light with a linear polarizer layer that has the linear polarization reflecting or absorbing direction orienting at 5° from the display surface plane.

The circle-symbol curve 914 shows the condition that the incident light onto the display surface is a linearly polarized light, whose polarization direction deviates from P-polarization by 10° so that it has 97% P-polarization and 3% S-polarization. The condition is achieved by filtering the ambient light with a linear polarizer layer that has the linear polarization reflecting or absorbing direction orienting at 10° from the display surface plane.

The square-symbol curve 915 shows the condition that the incident light onto the display surface is a linearly polarized light, whose polarization direction deviates from P-polarization by 20° so that it has 88% P-polarization and 12% S-polarization. The condition is achieved by filtering the ambient light with a linear polarizer layer that has the linear polarization reflecting or absorbing direction orienting at 20° from the display surface plane.

The triangle-symbol curve 916 is the condition that the incident light onto the display surface is a linearly polarized light, whose polarization direction deviates from P-polarization by 30° so that it has 75% P-polarization and 25% S-polarization. The condition is achieved by filtering the ambient light with a linear polarizer layer that has the linear polarization reflecting or absorbing direction orienting at 30° from the display surface plane.

As shown in FIG. 9A and Table 1 as follows, all conditions with the linearly polarized incident light having less than 30° deviation angle from P-polarization (the curve 912 through curve 916) show improved display ACR compared to the unpolarized incident light condition (curve 911). As the deviation angle between the linear polarization direction and the P-polarization increase from 0° (curve 912) to 30° (curve 916), the linearly polarized light has less and less P-polarization composition but more and more S-polarization composition, resulting in gradually reduced display ACR performance gain.

In conclusion, the present invention has no more than 30° deviation angle between the incident light linear polarization and display incident light P-polarization. To obtain good display readability at ambient light conditions, the linear polarization reflecting or absorbing direction of the polarization means is preferably oriented at no more than 30° from the display surface plane.

TABLE 1

| Curve | Light polarization | Polarization composition | The angle between the filtering polarizer's reflecting or absorbing direction and the display surface plane |
| --- | --- | --- | --- |
| Curve 911 | unpolarized | 50% P-polarization, 50% S-polarization | n/a |
| Curve 912 | linearly polarized | 100% P-polarization, 0% S-polarization | 0 DEG |
| Curve 913 | linearly polarized | 99% P-polarization, 1% S-polarization | 5 DEG |
| Curve 914 | linearly polarized | 97% P-polarization, 3% S-polarization | 10 DEG |
| Curve 915 | linearly polarized | 88% P-polarization, 12% S-polarization | 20 DEG |
| Curve 916 | linearly polarized | 75% P-polarization, 25% S-polarization | 30 DEG |

Example 2. Full Daylight Ambient Condition

Figure 9B:
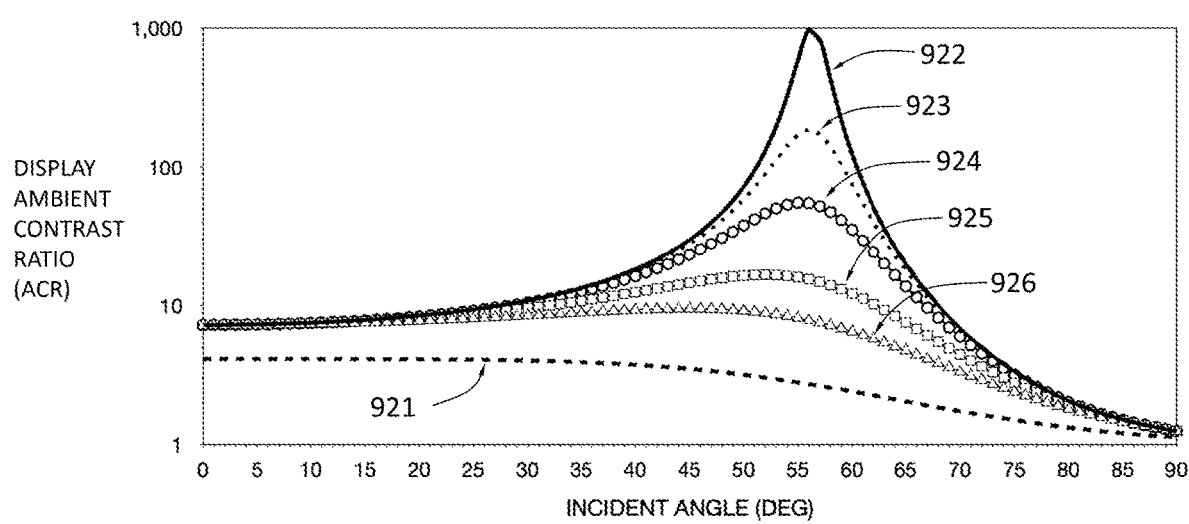

FIG. 9B shows the display ACR dependency on the light incident angle in the case of the ambient illuminance 20000 lux (roughly a typical full daylight ambient condition). The dashed curve 921 is the condition that the incident light onto the display surface is an unpolarized light that has both P-polarization and S-polarization and no polarization filtering control.

The solid curve 922 is the condition that the incident light onto the display surface is a linearly polarized light, whose polarization direction is parallel to P-polarization so that it has 100% P-polarization and 0% S-polarization. The condition is achieved by filtering the ambient light with a linear polarizer layer that has the linear polarization reflecting or absorbing direction parallel to the display surface plane so that the ambient light S-polarization is filtered out but only P-polarization passes through.

The dotted curve 923 is the condition that the incident light onto the display surface is a linearly polarized light, whose polarization direction deviates from P-polarization by 5° so that it has 99% P-polarization and 1% S-polarization. The condition is achieved by filtering the ambient light with a linear polarizer layer that has the linear polarization reflecting or absorbing direction orienting at 5° from the display surface plane.

The circle-symbol curve 924 is the condition that the incident light onto the display surface is a linearly polarized light, whose polarization direction deviates from P-polarization by 10° so that it has 97% P-polarization and 3% S-polarization. The condition is achieved by filtering the ambient light with a linear polarizer layer that has the linear polarization reflecting or absorbing direction orienting at 10° from the display surface plane.

The square-symbol curve 925 is the condition that the incident light onto the display surface is a linearly polarized light, whose polarization direction deviates from P-polarization by 20° so that it has 88% P-polarization and 12% S-polarization. The condition is achieved by filtering the ambient light with a linear polarizer layer that has the linear polarization reflecting or absorbing direction orienting at 20° from the display surface plane.

The triangle-symbol curve 926 is the condition that the incident light onto the display surface is a linearly polarized light, whose polarization direction deviates from P-polarization by 30° so that it has 75% P-polarization and 25% S-polarization. The condition is achieved by filtering the ambient light with a linear polarizer layer that has the linear polarization reflecting or absorbing direction orienting at 30° from the display surface plane.

As shown in FIG. 9B and Table 2, all conditions with the linearly polarized incident light having less than 30° deviation angle from P-polarization (the curve 922 through curve 926) show improved display ACR compared to the unpolarized incident light condition (curve 921). As the deviation angle between the linear polarization direction and the P-polarization increases from 0° (curve 922) to 30° (curve 926), the linearly polarized light has less and less P-polarization composition but more and more S-polarization composition, resulting in gradually reduced display ACR performance gain.

In conclusion, the present invention provides that it is preferable to have no more than 30° deviation angle between the incident light linear polarization and display incident light P-polarization. To obtain good display readability at ambient light conditions, the linear polarization reflecting or absorbing direction of the polarization means is preferably oriented at no more than 30° from the display surface plane.

TABLE 2

| Curve | Light polarization | Polarization composition | The angle between the filtering polarizer's reflecting or absorbing direction and the display surface plane |
|---|---|---|---|
| Curve 921 | unpolarized | 50% P-polarization, 50% S-polarization | n/a |
| Curve 922 | linearly polarized | 100% P-polarization, 0% S-polarization | 0 DEG |
| Curve 923 | linearly polarized | 99% P-polarization, 1% S-polarization | 5 DEG |
| Curve 924 | linearly polarized | 97% P-polarization, 3% S-polarization | 10 DEG |
| Curve 925 | linearly polarized | 88% P-polarization, 12% S-polarization | 20 DEG |
| Curve 926 | linearly polarized | 75% P-polarization, 25% S-polarization | 30 DEG |

Example 3. Direct Sunlight Ambient Condition

Figure 9C:
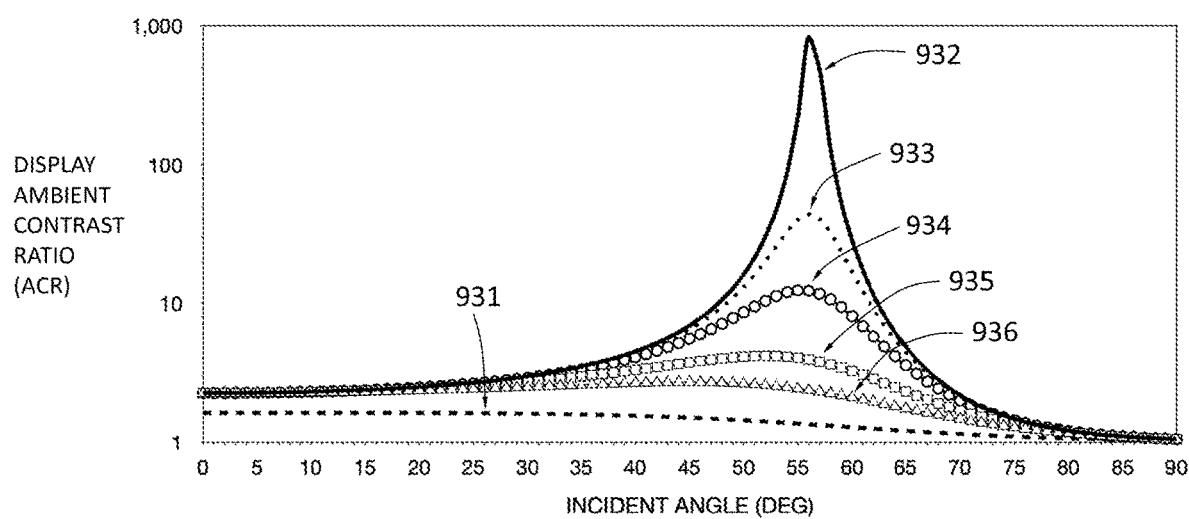

FIG. 9C shows the display ACR dependency on the light incident angle in the case of the ambient illuminance 100000 lux (roughly a typical direct sunlight ambient condition).

The dashed curve 931 is the condition that the incident light onto the display surface is an unpolarized light that has both P-polarization and S-polarization and no polarization filtering control.

The solid curve 932 is the condition that the incident light onto the display surface is a linearly polarized light, whose polarization direction is parallel to P-polarization so that it has 100% P-polarization and 0% S-polarization. The condition is achieved by filtering the ambient light with a linear polarizer layer that has the linear polarization reflecting or absorbing direction parallel to the display surface plane so that the ambient light S-polarization is filtered out but only P-polarization passes through.

The dotted curve 933 is the condition that the incident light onto the display surface is a linearly polarized light, whose polarization direction deviates from P-polarization by 5° so that it has 99% P-polarization and 1% S-polarization. The condition is achieved by filtering the ambient light with a linear polarizer layer that has the linear polarization reflecting or absorbing direction orienting at 5° from the display surface plane.

The circle-symbol curve 934 is the condition that the incident light onto the display surface is a linearly polarized light, whose polarization direction deviates from P-polarization by 10° so that it has 97% P-polarization and 3% S-polarization. The condition is achieved by filtering the ambient light with a linear polarizer layer that has the linear polarization reflecting or absorbing direction orienting at 10° from the display surface plane.

The square-symbol curve 935 is the condition that the incident light onto the display surface is a linearly polarized light, whose polarization direction deviates from P-polarization by 20° so that it has 88% P-polarization and 12% S-polarization. The condition is achieved by filtering the ambient light with a linear polarizer layer that has the linear polarization reflecting or absorbing direction orienting at 20° from the display surface plane.

The triangle-symbol curve 936 is the condition that the incident light onto the display surface is a linearly polarized light, whose polarization direction deviates from P-polarization by 30° so that it has 75% P-polarization and 25% S-polarization. The condition is achieved by filtering the ambient light with a linear polarizer layer that has the linear polarization reflecting or absorbing direction orienting at 30° from the display surface plane.

As shown in FIG. 9C and Table 3, the present invention provides that all conditions with the linearly polarized incident light having less than 30° deviation angle from P-polarization (the curve 932 through curve 936) show improved display ACR compared to the unpolarized incident light condition (curve 931). As the deviation angle between the linear polarization direction and the P-polarization increases from 0° (curve 932) to 30° (curve 936), the linearly polarized light has less and less P-polarization composition but more and more S-polarization composition, resulting in gradually reduced display ACR performance gain.

In conclusion, the present invention provides that it is preferable to have no more than 30° deviation angle between the incident light linear polarization and display incident light P-polarization. To obtain good display readability at ambient light conditions, the linear polarization reflecting or absorbing direction of the polarization means is preferably oriented at no more than 30° from the display surface plane.

TABLE 3

| Curve | Light polarization | Polarization composition | The angle between the filtering polarizer's reflecting or absorbing direction and the display surface plane |
|---|---|---|---|
| Curve 931 | unpolarized | 50% P-polarization, 50% S-polarization | n/a |
| Curve 932 | linearly polarized | 100% P-polarization, 0% S-polarization | 0 DEG |
| Curve 933 | linearly polarized | 99% P-polarization, 1% S-polarization | 5 DEG |
| Curve 934 | linearly polarized | 97% P-polarization, 3% S-polarization | 10 DEG |
| Curve 935 | linearly polarized | 88% P-polarization, 12% S-polarization | 20 DEG |
| Curve 936 | linearly polarized | 75% P-polarization, 25% S-polarization | 30 DEG |

I claim:

1. A method for improving readability of a display inside a motorized object, comprising
   applying a polarization means on a side window of a motorized object, wherein an ambient light propagates through the side window to become a display incident light, the display incident light is reflected by a surface of a display inside the motorized object to form a reflected light, and the display incident light and the reflected light form a display incident plane, and
   substantially filtering out S-polarization relative to the display incident plane from the ambient light and allowing P-polarization relative to the display incident plane from the ambient light to pass through the side window by the polarization means, wherein the polarization means has a linear polarization reflecting or absorbing direction that is substantially parallel to a plane of the surface of the display;

the polarization means is on the side window that is on a passenger side, a driver side, or both the passenger and driver sides of the motorized object; and the side window is a front side window, a rear side window, or both front and rear side windows.

2. The method of claim 1, wherein the polarization means is passively applied on the side window.

3. The method of claim 1, wherein the polarization means is switchable on the side window.

4. The method of claim 1, wherein the side window is of a round, oval, trapezoid, rectangle, square, triangle, or irregular shape.

5. The method of claim 1, wherein the linear polarization reflecting or absorbing direction has no more than 20 degree deviation from being parallel to the plane of the surface of the display.

6. The method of claim 1, wherein the linear polarization reflecting or absorbing direction has no more than 10 degree deviation from being parallel to the plane of the surface of the display.

7. The method of claim 1, wherein the linear polarization reflecting or absorbing direction has no more than 5 degree deviation from being parallel to the plane of the surface of the display.

8. The method of claim 1, wherein the polarization means filters out at least 75% of the S-polarization from the ambient light.

9. The method of claim 1, wherein the polarization means filters out at least 88% of the S-polarization from the ambient light.

10. The method of claim 1, wherein the polarization means filters out at least 97% of the S-polarization from the ambient light.

11. The method of claim 1, wherein the polarization means filters out at least 99% of the S-polarization from the ambient light.

12. A display readability enhancing system for use in the method of claim 1, comprising the polarization means, wherein the polarization means has the linear polarization reflecting or absorbing direction that is substantially parallel to the plane of the surface of the display; and the polarization means is on the side window that is on the passenger side, the driver side, or both the passenger and driver sides of the motorized object.

13. The display readability enhancing system of claim 12, wherein the polarization means is located on an interior side of the side window.

14. The display readability enhancing system of claim 12, wherein the polarization means is located on an exterior side of the side window.

15. The display readability enhancing system of claim 12, wherein the polarization means is sandwiched between two layers of the side window.

16. The display readability enhancing system of claim 12, wherein the polarization means is a passive means.

17. The display readability enhancing system of claim 12, wherein the polarization means is switchable.

18. The display readability enhancing system of claim 12, wherein the polarization means filters out at least 75% of the S-polarization from the ambient light.

* * * * *